(12) United States Patent
Joko (10) Patent No.: US 8,831,036 B2
(45) Date of Patent: Sep. 9, 2014

(54) LARGE CELL BASE STATION AND COMMUNICATION CONTROL METHOD

(75) Inventor: Shingo Joko, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 107 days.

(21) Appl. No.: 13/504,866

(22) PCT Filed: Oct. 28, 2010

(86) PCT No.: PCT/JP2010/069127
§ 371 (c)(1),
(2), (4) Date: Apr. 27, 2012

(87) PCT Pub. No.: WO2011/052663
PCT Pub. Date: May 5, 2011

(65) Prior Publication Data
US 2012/0213188 A1    Aug. 23, 2012

(30) Foreign Application Priority Data

Oct. 29, 2009  (JP) .................................. 2009-249464

(51) Int. Cl.
*H04J 3/16* (2006.01)
*H04J 3/06* (2006.01)
*H04W 36/00* (2009.01)

(52) U.S. Cl.
USPC ............................ 370/468; 370/350; 455/444

(58) Field of Classification Search
CPC .............. H04J 3/16; H04J 3/06; H04W 36/00
USPC ................. 370/468, 350, 329, 344, 319, 503, 370/508–510, 318; 455/443, 444, 450, 452, 455/453, 13.4, 524, 525, 68, 69
See application file for complete search history.

(56) References Cited

U.S. PATENT DOCUMENTS

| | | | |
|---|---|---|---|
| 6,799,044 B1 | 9/2004 | Wesby et al. | |
| 8,374,615 B2* | 2/2013 | Joko | 455/448 |
| 8,412,256 B2* | 4/2013 | Lee et al. | 455/522 |

(Continued)

FOREIGN PATENT DOCUMENTS

| | | |
|---|---|---|
| CN | 1953576 A | 4/2007 |
| CN | 101262691 A | 9/2008 |

(Continued)

OTHER PUBLICATIONS

TSG-RAN Working Group 4 (Radio) meeting #52; NTT DOCOMO; "Downlink Interference Coordination Between eNodeB and Home eNodeB"; R4-093244; Shenzhen; Aug. 24-28, 2009.

(Continued)

*Primary Examiner* — Hanh N Nguyen
(74) *Attorney, Agent, or Firm* — Studebaker & Brackett PC (57) ABSTRACT

When the provided large cell base station (100) is to allocate a resource block to a radio terminal (200) connected to said large cell base station (100), band-use restriction information that indicates use restrictions on the frequency band corresponding to the aforementioned resource block is transmitted to a small cell base station (300). The large cell base station (100) then allocates the resource block to the radio terminal (200) after an amount of time corresponding to the signal transmission delay from the large cell base station (100) to the small cell base station (300) has passed since the aforementioned transmission.

8 Claims, 5 Drawing Sheets

(56) References Cited

U.S. PATENT DOCUMENTS

| | | | |
|---|---|---|---|
| 8,583,135 B2* | 11/2013 | Hiltunen et al. | 455/452.2 |
| 2006/0014554 A1 | 1/2006 | Gerlach | |
| 2007/0093268 A1 | 4/2007 | Hosono et al. | |
| 2007/0280170 A1 | 12/2007 | Kawasaki | |
| 2009/0131056 A1 | 5/2009 | Bontu et al. | |
| 2012/0142334 A1* | 6/2012 | Sato et al. | 455/422.1 |
| 2012/0214498 A1* | 8/2012 | Joko | 455/449 |

FOREIGN PATENT DOCUMENTS

| | | |
|---|---|---|
| JP | 09-055698 | 2/1997 |
| JP | 2002-528974 A | 9/2002 |
| JP | 2003-259414 A | 9/2003 |
| JP | 2006-033826 A | 2/2006 |
| JP | 2007-158568 A | 6/2007 |
| JP | 2009-152826 A | 7/2009 |
| JP | 2009-207055 A | 9/2009 |
| KR | 10-2007-0093996 A | 9/2007 |
| WO | 2006/087797 A1 | 8/2006 |
| WO | 2009/067637 A1 | 5/2009 |

OTHER PUBLICATIONS

Y.Matsuno; Japanese Office Action; "Notification of Reason(s) for Refusal"; JP2009-249464; Feb. 16, 2010.

Y.Matsuno; Japanese Office Action; "Notification of Reason(s) for Refusal"; JP2009-249464; Jul. 2, 2010.

International Search Report; PCT/JP2010/069127; Nov. 30, 2010.

An Office Action issued by the Korean Patent Office on Aug. 29, 2013, which corresponds to Korean Patent Application No. 2012-7012081 and is related to U.S. Appl. No. 13/504,866; with Concise Explanation.

3GPP TS-RAN WG1 #58; Qualcomm Europe; "Heterogeneous deployment studies for LTE-Advanced"; Shenzhen, China; Aug. 24-28, 2009; R1-093140.

The first Office Action issued by the Chinese Patent Office on Mar. 31, 2014, which corresponds to Chinese Patent Application No. 201080048547.9 and is related to U.S. Appl. No. 13/504,866; with English language concise explanation.

* cited by examiner

FIG. 1

LARGE CELL BASE STATION AND COMMUNICATION CONTROL METHOD

TECHNICAL FIELD

The present invention relates to a large cell base station to which a radio terminal is connected, the large base station configured to forma large cell in which a small cell base station configured to form a small cell smaller than the large cell is installed, and to a communication control method in the large cell base station.

BACKGROUND ART

An LTE standardized by 3GPP that is a standard-setting organization for a mobile communication system is a next generation radio communication system that achieves communications with a higher speed and a larger capacity compared with currently operated 3rd and 3.5th radio communication systems. Technical specifications of the LTE have been determined with a 3GPP Release 8. Recently, a Release 9 that is a function improved version of the Release 8 and an LTE Advanced that is an upgraded version of the LTE have been studied.

In the LTE Release 9, standardization of detail functions and requirements of a small cell base station (Home eNodeB) are under development. The small cell base station is a small base station capable of being installed in a room and is configured to forma cell (referred to as small cell) which is a communication area having a radius of several to several tens of meters. The small cell base station is installed to balance the traffic of a large cell base station (Macro eNodeB) configured to form a large cell which is a communication area having a radius of about several hundreds of meters and to cover a dead area in the large cell.

In such a radio communication system, interference may occur in radio communications of a radio terminal connected to the large cell base station due to radio communications of the small cell base station in the following case. Specifically, this occurs when a frequency band of a resource block that is a radio resource capable of being allocated to the radio terminal in the large cell base station partly or completely overlaps with a frequency band of a resource block that is a radio resource capable of being allocated to another radio terminal in the small cell base station. To avoid the interference, for example, Non-Patent Document 1 proposes a technique in which an interface is established between the large cell base station and the small cell base station, and a resource block to be allocated by the small cell base station is restricted by the large cell base station through transmitting a predetermined message to the small cell base station.

PRIOR ART DOCUMENTS

Non-Patent Documents

NON-PATENT DOCUMENT 1: R4-093244, "Downlink Interference Coordination Between eNodeB and Home eNodeB," NTT DOCOMO

SUMMARY OF THE INVENTION

However, in the conventional technique described above, scheduling based on a so-called round robin scheme is employed and a transmission delay of a signal between the large cell base station and the small cell base station is not taken into consideration. Thus, before the small cell base station that has received the predetermined message stops using the resource block, the large cell base station may start using a resource block with the same frequency band as that of the resource block used by the small cell base station. Thus, the interference may not be avoided as a result.

Thus, an objective of the present invention is to provide a large cell base station and a communication control method that can appropriately reduce interference from a small cell base station to a radio terminal connected to the large cell base station.

The present invention has the following features to solve the problems described above. A first feature of a radio communication apparatus according to the present invention is summarized as follows. A large cell base station (large cell base station 100) to which a radio terminal (radio terminal 200) is connected, the large cell base station configured to form a large cell (MC1) in which a small cell base station (small cell base stations 300a, 300b) configured to forma small cell (FC1, FC2) smaller than the large cell is installed, comprises: an acquisition unit (acquisition unit 123) configured to acquire a transmission delay time of a signal from the large cell base station to the small cell base station; a determination unit (determination unit 122) configured to determine a radio resource to be allocated to the radio terminal; a band use restriction information transmitter (band use restriction information transmitter 124) configured to transmit band use restriction information to the small cell base station, the band use restriction information instructing use restriction of a frequency band corresponding to the radio resource determined by the determination unit; and an allocation unit (allocation unit 125) configured to allocate the radio resource determined by the determination unit to the radio terminal after the transmission delay time has elapsed after the band use restriction information is transmitted.

Such a large cell base station performs the following operation when allocating the radio resource to the radio terminal connected thereto in a case where the large cell base station has transmitted to the small cell base station, the band use restriction information instructing the use restriction of the frequency band corresponding to the radio resource. Specifically, the large cell base station allocates the radio resource to the radio terminal when the transmission delay time of the signal from the large base station to the small cell base station has elapsed. Thus, after the small cell base station has released the radio resource of which the use is restricted, the large cell base station can allocate a radio resource of which the frequency band partially or completely overlaps with the frequency band of the released radio resource. Accordingly, the same frequency band is prevented from being used by the large cell base station and the small cell base station, whereby the occurrence of the interference is prevented.

A second feature of a radio communication apparatus according to the present invention is summarized as follows. The large cell base station comprises: a band use restriction release information transmitter (band use restriction release information transmitter 126) configured to transmit band use restriction release information to the small cell base station at a predetermined timing after the radio resource is allocated to the radio terminal, the band use restriction release information instructing release of the use restriction of the frequency band corresponding to the radio resource determined by the determination unit; and a release unit (release unit 127) configured to release the radio resource allocated to the radio terminal before the transmission delay time elapses after the band use restriction release information is transmitted.

Such a large cell base station performs the following operation when releasing the radio resource to the radio terminal connected thereto in a case where the large cell base station has transmitted to the small cell base station, the band use restriction release information instructing release of the use restriction of the frequency band corresponding to the radio resource. Specifically, the large cell base station releases the radio resource before transmission delay time of the signal from the large base station to the small cell base station elapses after the transmission. Thus, before the small cell base station allocates the radio resource of which the use restriction is released, the large cell base station can release a radio resource of which the frequency band partly or completely overlaps with the frequency band of the released radio resource. Accordingly, the same frequency band is prevented from being used by the large cell base station and the small cell base station, whereby the occurrence of the interference is prevented.

A third feature of a radio communication apparatus according to the present invention is summarized as follows. The acquisition unit acquires the transmission delay time on the basis of a time between transmission of a predetermined signal to the small cell base station and reception of a response signal from the small cell base station.

A fourth feature of a radio communication apparatus according to the present invention is summarized as follows. The acquisition unit corrects the transmission delay time on the basis of a reception interval of a signal periodically transmitted by the small cell base station 300.

A fifth feature of a radio communication apparatus according to the present invention is summarized as follows. The acquisition unit acquires the transmission delay time on the basis of a change of a CQI (Channel Quality Indicator) transmitted from the radio terminal in a case where the use restriction is imposed on the frequency band corresponding to the radio resource in the small cell base station.

A sixth feature of a radio communication apparatus according to the present invention is summarized as follows. The large cell base station further comprises a reception unit (reception processor 121) configured to receive information indicating a communication quality from the radio terminal, wherein the determination unit determines the radio resource to be allocated to the radio terminal when the information indicating the communication quality is received.

A seventh feature of a radio communication apparatus according to the present invention is summarized as follows. The band use restriction information transmitter transmits the band use restriction information when a ratio of an amount of interference received from the small cell base station to an entire amount of interference received by the radio terminal is equal to or larger than a predetermined value.

Am eighth feature of a radio communication apparatus according to the present invention is summarized as follows. A communication control method in a large cell base station to which a radio terminal is connected, the large cell base station configured to form a large cell in which a small cell base station configured to form a small cell smaller than the large cell is installed, comprises: acquiring, at the large cell base station, a transmission delay time of a signal from the large cell base station to the small cell base station; determining, at the large cell base station, a radio resource to be allocated to the radio terminal; transmitting, at the large cell base station, band use restriction information to the small cell base station, the band use restriction information instructing use restriction of a frequency band corresponding to the determined radio resource; and allocating, at the large cell base station, the determined radio resource to the radio terminal after the transmission delay time has elapsed after the band use restriction information is transmitted.

According to the present invention, the interference from the small cell base station to the radio terminal connected to the large cell base station can be appropriately reduced.

DESCRIPTION OF THE EMBODIMENTS

Next, an embodiment of the present invention will be described with reference to the drawings. Specifically, a description is given on (1) Configuration of Radio Communication System, (2) Operation of Radio Communication System, (3) Advantageous Effects, and (4) Other Embodiments. In the description of the drawings of the embodiment below, same or similar reference signs denote same or similar elements and portions.

Figure 1:
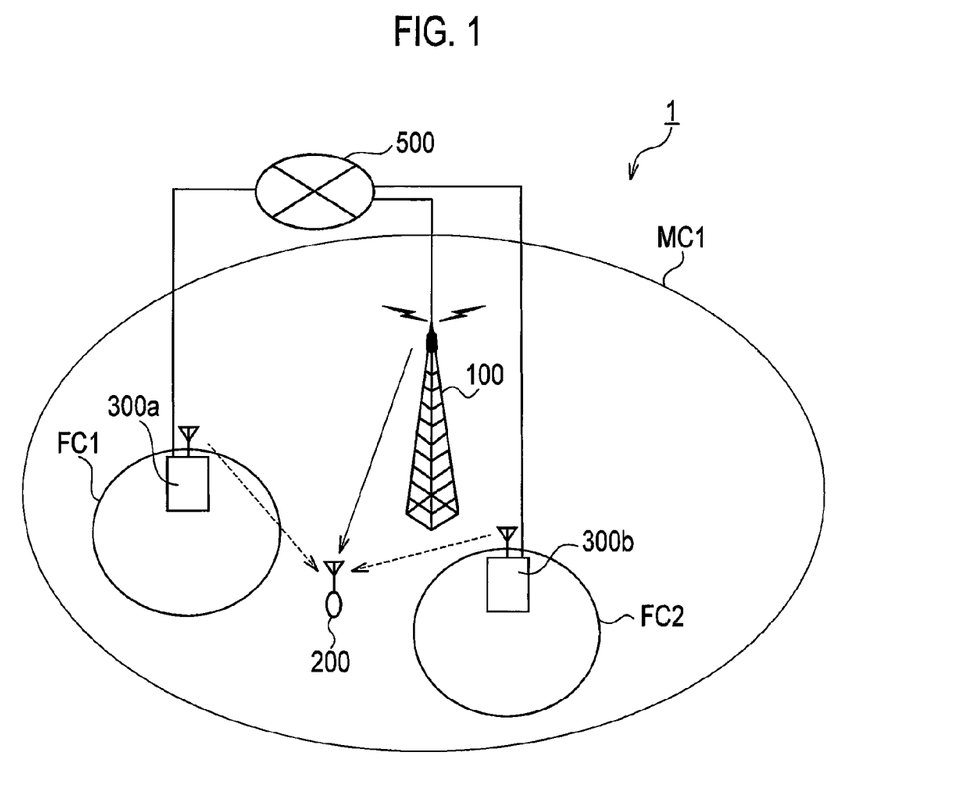
FIG. 1 is an overall schematic configuration view of a radio communication system according to an embodiment of the present invention.

(1) Configuration of Radio Communication System
(1.1) Overall Schematic Configuration of Radio Communication System FIG. 1 is an overall schematic configuration view of a radio communication system 1 according to an embodiment of the present invention. The radio communication system 1 has a configuration based on an LTE Release 9 that is a 3.9th generation (3.9G) cell-phone system or an LTE-Advanced regarded as a 4th generation (4G) cell-phone system.

As shown in FIG. 1, the radio communication system 1 includes a large cell base station (e.g., macrocell base station) 100 configured to form a large cell (e.g., macrocell) MC1 as a radio wave range and small cell base stations (e.g., femtocell base station) 300a and 300b configured to form small cells (e.g., femtocell) FC1 and FC2 as radio wave ranges, respectively. The large cell MC1 has a radius of about several hundreds of meters for example, and the small cells FC1 and FC2 each have a radius of about several to several tens of meters for example. A radio terminal 200 is connected to the large cell base station 100.

In the description given below, when the small cells FC1 and FC2 are not distinguished from each other, the cells are simply referred to as "small cell FC". When the small cell base stations 300a and 300b are not distinguished from each other, the base stations are simply referred to as "small cell base station 300".

The large cell base station 100 is installed at a portion based on a station installation plan in which an inter-cell interference is taken into account by a communication carrier. In contrast, the small cell base station 300 has a small size to be suitably installed in a desired place (in a room, specifically) by a user. The small cell base station 300 is installed in the large cell MC1 to balance the traffic of the large cell base station 100 and to cover a dead area in the large cell MC1.

The large cell base station 100 and the small cell base station 300 are connected to a network 500. The network 500 may be a LAN, the Internet, and the like. The network 500 may also be a dedicated network established between the large cell base station 100 and the small cell base station 300.

A downlink (link from the large cell base station 100 to the radio terminal 200, which will be hereinafter referred to as "large cell downlink") frequency band used in communications between the large cell base station 100 and the radio terminal 200 connected with each other may be the same with a downlink (link from the small cell base station 300 to an unillustrated radio terminal, which will be hereinafter referred to as "small cell downlink") frequency band used in communications between the small cell base station 300 and the unillustrated radio terminal connected with each other. In such a case, the radio terminal 200 communicating with the large cell base station is interfered by a radio signal transmitted to the unillustrated radio terminal from the small cell base station 300 through the downlink.

When the radio terminal 200 is interfered by the small cell base station 300 as described above, the large cell base station 100 controls downlink transmission power of the small cell base station 300 so that the interference is reduced.

(1.2) Configuration of Large Cell Base Station

Figure 2:
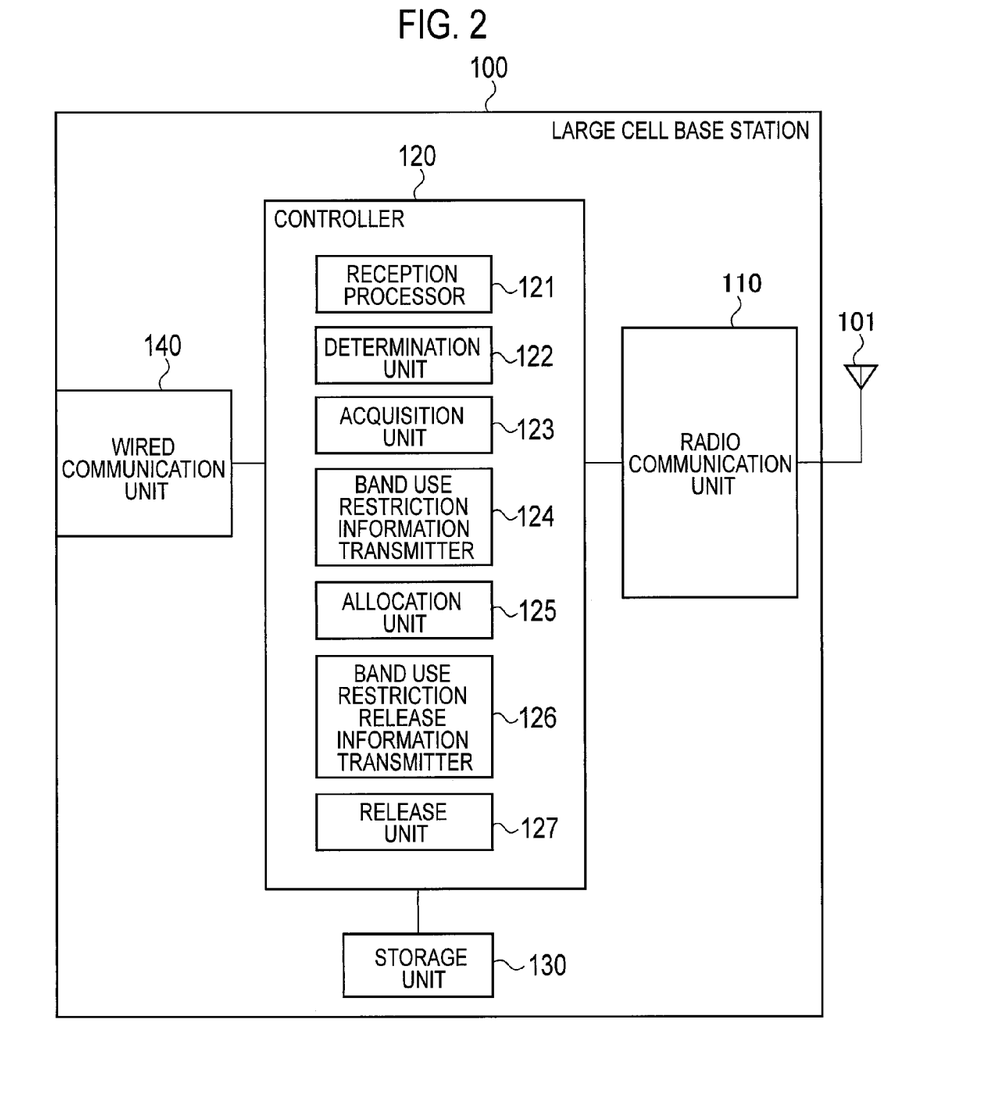
FIG. 2 is a block diagram showing a configuration of a large cell base station according to the embodiment of the present invention.

FIG. 2 is a block diagram showing a configuration of the large cell base station 100. As shown in FIG. 2, the large cell base station 100 employs a PF (Proportional Fair) scheme and includes an antenna unit 101, a radio communication unit 110, a controller 120, a storage unit 130, and a wired communication unit 140.

The radio communication unit 110 includes a radio frequency (RF) circuit, a baseband (BB) circuit, and the like, and transmits and receives a radio signal through the antenna unit 101. In addition, the radio communication unit encodes and modulates a transmission signal and demodulates and decodes a received signal.

The controller 120 is formed of a CPU for example and is configured to control various functions of the large cell base station 100. The storage unit 130 is formed of a memory for example and is configured to store therein various pieces of information used for the control of the large cell base station 100 and the like. The wired communication unit 140 is configured to communicate with an unillustrated other large cell, the small cell base station 300, and the like through the network 500.

The controller 120 includes a reception processor 121, an acquisition unit 123, a determination unit 122, a band use restriction information transmitter 124, an allocation unit 125, a band use restriction release information transmitter 126, and a release unit 127.

The reception processor 121 receives information indicating a communication quality in the radio terminal 200 from the radio terminal 200 through the antenna unit 101 and the radio communication unit 110. The information indicating the communication quality in the radio terminal 200 includes: a CQI (Channel Quality Indicator); a received electrical field intensity (hereinafter referred to as "RSRP (from small cell base station to large cell terminal)" of a reference signal from the small cell base station 300 in the radio terminal 200; a received electrical field intensity (hereinafter referred to as "RSRP (from large cell base station to large cell terminal)" of a reference signal from the large cell base station 100 to which the radio terminal 200 is connected in the radio terminal 200; and a received electrical field intensity (hereinafter referred to as "RSRP (from other large cell base station to large cell terminal)" of a reference signal from a large cell base station (herein after referred to as "other large cell base station") to which the radio terminal 200 is not connected, i.e., a large cell base station other than the large cell base station 100, in the radio terminal 200.

The RSRP (from small cell base station to large cell terminal) is also used as information indicating an amount of interference received by the radio terminal 200 from the small cell base station 300. The RSRP (from small cell base station to large cell terminal) is measured in the radio terminal 200 for each small cell base station 300 that has transmitted the reference signal and includes an ID as identification information of the corresponding small cell base station 300. The RSRP (from other large cell base station to large cell terminal) is measured in the radio terminal 200 for each of the other large cell base stations that have transmitted the reference signal.

Then, on the basis of the received CQI, the RSRP (from small cell base station to large cell terminal), the RSRP (from large cell base station to large cell terminal), and the RSRP (from other large cell base station to large cell terminal), the reception processor 121 determines whether the radio terminal 200 that has transmitted the information is receiving interference of a predetermined amount or larger from the small cell base station 300.

Specifically, the reception processor 121 calculates I (large cell terminal) that is an entire amount of interference received by the radio terminal 200. The following first to third methods are used for the calculation of I (large cell terminal).

In the first method, the reception processor 121 calculates the sum of the RSRP (from small cell base station to large cell terminal) and the RSRP (from other large cell base station to large cell terminal).

Then, the reception processor 121 adds a predetermined thermal noise power value to the sum of the RSRP (from small cell base station to large cell terminal) and the RSRP (from other large cell base station to large cell terminal). Thus, I (large cell terminal) is obtained. The thermal noise power value is stored in the storage unit 130. Alternatively, the thermal noise power value is transmitted from the radio terminal 200.

In the second method, the reception processor 121 calculates a SINR (Signal to Interference and Noise Ratio) corresponding to the large cell downlink in the radio terminal 200 on the basis of the CQI. Then, the reception processor 121 divides the RSRP (from large cell base station to large cell terminal) by the SINR. Thus, I (large cell terminal) is obtained.

In the third method, the reception processor 121 calculates the SINR (Signal to Interference and Noise Ratio) corresponding to the large cell downlink in the radio terminal 200 on the basis of the CQI.

In this process, the controller 120 measures a propagation loss (hereinafter referred to as "uplink propagation loss") in the uplink (link from the radio terminal 200 to the large cell base station 100 that is hereinafter referred to as "large cell uplink") used for communications between the large cell base station 100 and the radio terminal 200 connected to each other. The uplink propagation loss includes a distance attenuation, a shadowing loss, and a feature passing loss.

The reception processor 121 estimates a propagation loss (hereinafter referred to as "downlink propagation loss") PL in the large cell downlink from the uplink propagation loss. For example, the reception processor 121 regards the uplink propagation loss as a downlink propagation loss. Alternatively, the reception processor 121 regards a value obtained by adding a predetermined correction value to the uplink propagation loss as the downlink propagation loss.

Then, the reception processor 121 acquires a transmission power density (hereinafter referred to as "downlink transmission power density") P of the large cell downlink in the large cell base station 100. For example, the downlink transmission power density P is stored in the storage unit 130. The reception processor 121 divides the downlink transmission power density P by the downlink propagation loss PL and further divides the resultant value by the SINR. Thus, I (large cell terminal) is obtained.

After I (large cell terminal) is obtained through any one of the first to the third methods, the reception processor 121 divides the RSRP (from small cell base station to large cell terminal) by I (large cell terminal) to calculate a ratio (hereinafter referred to as "small cell base station interference amount rate") of the amount of the interference received by the radio terminal 200 from the small base station 300 corresponding to the RSRP (from small cell base station to large cell terminal) to the entire amount of interference received by the radio terminal 200. When the reception processor 121 has received a plurality of RSRPs (from small cell base station to large cell terminal), that is, when the radio terminal 200 is receiving the interference from a plurality of small cell base stations 300, the reception processor 121 divides the RSRP (from small cell base station to large cell terminal) by I (large cell terminal) for each of the RSRPs (from small cell base station to large cell terminal) corresponding to the respective small cell base stations 300. Thus, the reception processor 121 calculates the small cell base station interference amount ratio for each small cell base station 300.

Furthermore, the reception processor 121 determines whether the calculated small cell base station interference amount ratio is equal to or larger than a threshold value α. The threshold value α is areal number (e.g., 0.9) between 0 to 1. The threshold value α is predetermined and is stored in the storage unit 130.

If the small cell base station interference amount ratio is equal to or larger than the threshold value α, the radio terminal 200 is largely affected by the interference from the small cell base station 300. In such a case, the controller 120 ceases resource block allocation based on the PF scheme and performs a control so that the small cell based station 300 does not allocate to another radio terminal connected to the small cell base station 300, a resource block having a frequency band partly or completely overlapping with a frequency band of a resource block to be allocated to the radio terminal 200.

The determination unit 122 determines a resource block to be newly allocated to the radio terminal 200 largely affected by the interference from the small cell base station 300.

The acquisition unit 123 acquires a transmission delay time of a signal to the small cell base station 300 as a source of the interference received by the radio terminal 200. If there are a plurality of small cell base stations 300 as the sources of the interference received by the radio terminal 200, the transmission delay time is acquired for each small cell base station 300.

For example, the transmission delay time, e.g., 20 microseconds, is predetermined and is a time, which is estimated from past statistics or the like, by which a signal reaches the small cell base station 300 at the latest. Here, the transmission delay time is stored in the storage unit 130 and the acquisition unit 123 reads out the transmission delay time stored in the storage unit 130.

Alternatively, the transmission delay time is a transmission delay time measured when a network is established in the radio communication system 1. For example, in the LTE, when establishing an X2 connection, the large cell base station 100 transmits "X2 SETUP REQUEST" message, and "X2 SETUP RESPONSE" message as a response to the message is transmitted from the small cell base station 300. Here, ½ of the time between the transmission of the "X2 SETUP REQUEST" message to the transmission of the "X2 SETUP RESPONSE" message is measured as the transmission delay time and stored in the storage unit 130. The acquisition unit 123 reads out the transmission delay time stored in the storage unit 130.

Alternatively, the large cell base station 100 periodically transmits a predetermined signal (e.g., ping when the network 500 is a network employing TCP/IP such as a LAN, the Internet, and the like) to the small cell base station 300 and receives a response signal from the small cell base station 300. The acquisition unit 123 acquires ½ of the time between the transmission of the last signal and the reception of the response signal. The acquired time is the transmission delay time. Moreover, the acquisition unit 123 acquires the change of the transmission delay time on the basis of the reception interval of a message such as an OI (Overload Indicator) periodically transmitted from the small cell base station 300 and corrects the transmission delay time in accordance with the change. Specifically, the transmission delay message is corrected to be longer with a longer message reception interval.

Alternatively, the acquisition unit 123 acquires the transmission delay time on the basis of the change of the CQI transmitted from the radio terminal 200 in a case where the use of the frequency band in the small cell base station 300 is restricted. Specifically, when a use restriction is imposed on the frequency band in the small cell base station 300, the CQI improves. In such a case, the acquisition unit 123 acquires a time between the transmission of band use restriction information described later by the large cell base station 100 and the improving of the CQI. The acquired time is the transmission delay time. Here, the acquired transmission delay time is stored in the storage unit 130 and is used for releasing the use restriction of the frequency band in the small cell base station 300 and for restricting the use of the frequency band thereafter.

When the small cell base station interference amount ratio is equal to or larger than the threshold value α, the band use restriction information transmitter 124 generates the band use restriction information indicating the use restriction of the frequency band corresponding to the resource block determined by the determination unit 122. The band use restriction information includes information on the frequency band of which the use is to be restricted.

Furthermore, the band use restriction information transmitter 124 transmits an RNTP message including the generated band use restriction information to the small cell base station 300 through the wired communication unit 140 and the network 500. Here, the destination is one or a plurality of small cell base station 300 corresponding to the RSRP (from small cell base station to large cell terminal) used for calculating the small cell base station interference amount ratio equal to or higher than the threshold value α among the small cell base station interference amount ratios.

When receiving the RNTP message including the band use restriction information, the small cell base station 300 restricts the allocation of the resource block corresponding to the frequency band included in the band use restriction information to the other radio terminals. If the resource block corresponding to the frequency band included in the band use restriction information has already been allocated, the small cell base station 300 releases the resource block.

The allocation unit 125 determines whether a time corresponding to the transmission delay time has elapsed after the transmission of the RNTP message including the band use restriction information by the band use restriction information transmitter 124. When the band use restriction information transmitter 124 has transmitted the RNTP message including the band use restriction information to a plurality of small cell base stations 300, the allocation unit 125 determines whether the time corresponding to the longest transmission delay time among the transmission delay times respectively corresponding to the small cell base stations 300 as the destinations has elapsed.

After the time corresponding to the transmission delay time has elapsed after the transmission of the RNTP message including the band use restriction information by the band use restriction information transmitter 124, the allocation unit 125 allocates the resource block determined by the determination unit 122 to the radio terminal 200 largely affected by the interference from the small cell base station 300. The allocation unit 125 may perform the following operation in consideration of a processing time for restricting the allocation of the resource block corresponding to the frequency band included in the band use restriction information to the other radio terminal after the reception of the RNTP message including the band use restriction information by the small cell base station 300. Specifically, the allocation unit 125 may allocate the resource block determined by the determination unit 122 to the radio terminal 200 largely affected by the interference from the small cell base station 300 after a time corresponding to a time obtained by adding the processing time for the allocation restriction in the small cell base station 300 to the transmission delay time after the transmission of the RNTP message including the band use restriction information. In such a case, the processing time for the allocation restriction in the small cell base station 300 is predetermined and stored in the storage unit 130.

The band use restriction release information transmitter 126 determines whether a resource block release timing has arrived that is a predetermined timing after the allocation unit 125 has allocated the resource block to the radio terminal 200. The resource block release timing is a timing arriving when a predetermined time elapses after the allocation unit 125 has allocated the resource block to the radio terminal 200 for example.

When the resource block release timing has arrived, the band use restriction release information transmitter 126 generates the band use restriction release information instructing the release of the usage limitation of the frequency band corresponding to the resource block determined by the determination portion 122. The band use restriction release information includes information on the frequency band of which the use restriction is to be released.

Furthermore, the band use restriction release information transmitter 126 transmits the RNTP message including the generated band use restriction release information to the small cell base station 300 through the wired communication unit 140 and the network 500. Here, the destination is the same small cell base station 300 as the destination of the RNTP message including the band use restriction information transmitted by the band use restriction information transmitter 124.

The release unit 127 releases the resource block allocated to the radio terminal 200 by the allocation unit 125 before the time corresponding to the transmission delay time elapses after the transmission of the RNTP message including the band use restriction release information by the band use restriction release information transmitter 126. Here, if the band use restriction release information transmitter 126 has transmitted the RNTP message including the band use restriction release information to a plurality of small cell base stations 300, the release unit 127 performs the following operation. Specifically, the release unit 127 releases the resource block allocated to the radio terminal 200 by the allocation unit 125 before the time corresponding to the shortest transmission delay time among the transmission delay times respectively corresponding to the small cell base stations 300 as the destinations elapses. Then, the control unit 120 resumes the resource block allocation based on the PF scheme.

When receiving the RNTP message including the band use restriction release information, the small cell base station 300 releases the allocation restriction of the resource block corresponding to the frequency band included in the band use restriction release information.

(2) Operation of Radio Communication System

Next, the operation of the radio communication system 1 will be described.

Figure 3:
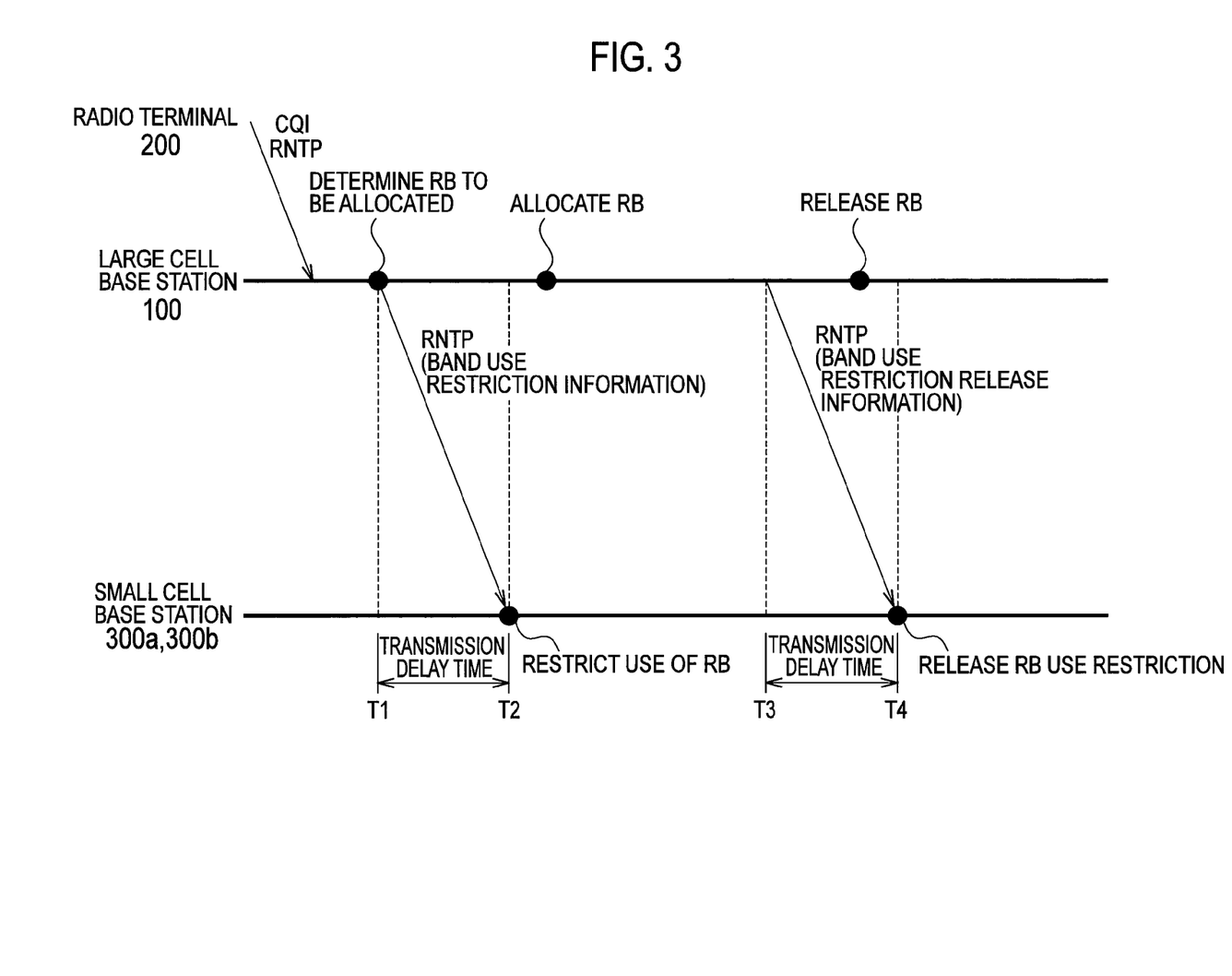
FIG. 3 is a time chart showing an operation of the radio communication system according to the embodiment of the present invention.

FIG. 3 is a time chart showing the operation of the radio communication system 1. As shown in FIG. 3, the large cell base station 100 receives from the radio terminal connected to the large cell base station 100, the CQI, the RSRP (from small cell base station to large cell terminal), the RSRP (from large cell base station to large cell terminal), and the RSRP (from other large cell base station to large cell terminal).

Then, the large cell base station 100 determines the resource block to be allocated to the radio terminal 200 and transmits the RNTP message including the band use restriction information to the small cell base station 300.

The small cell base station 300 receives the RNTP message including the band use restriction information after the time corresponding to the transmission delay time (T2-T1) has elapsed after the large cell base station 100 has transmitted the RNTP message including the band use restriction information to the small cell base station 300. Then, the small cell base station 300 restricts the use of a predetermined resource block in accordance with the band use restriction information.

Meanwhile, the large cell base station 100 allocates the determined resource block to the radio terminal 200 after the time corresponding to the transmission delay time (T2-T1) has elapsed after the RNTP message including the band use restriction information is transmitted.

Then, when the resource block release timing arrives, the large cell base station 100 transmits the RNTP message including the band use restriction release information to the small cell base station 300. Furthermore, the large cell base station 100 releases the resource block allocated to the radio terminal 200 before the time corresponding to the transmission delay time (T4-T3) elapses after the RNTP message including the band use restriction release information is transmitted to the small cell base station 300.

Meanwhile, the small cell base station 300 receives the RNTP message including the band use restriction release information when the time corresponding to the transmission delay time (T4-T3) has elapsed after the large cell base station 100 has transmitted the RNTP message including the band use restriction release information. Thereafter, the small cell base station 300 releases the use restriction of the resource block of which the use has been restricted in accordance with the band use restriction release information.

Next, operations of the large cell base station 100 will be described.

Figure 4:
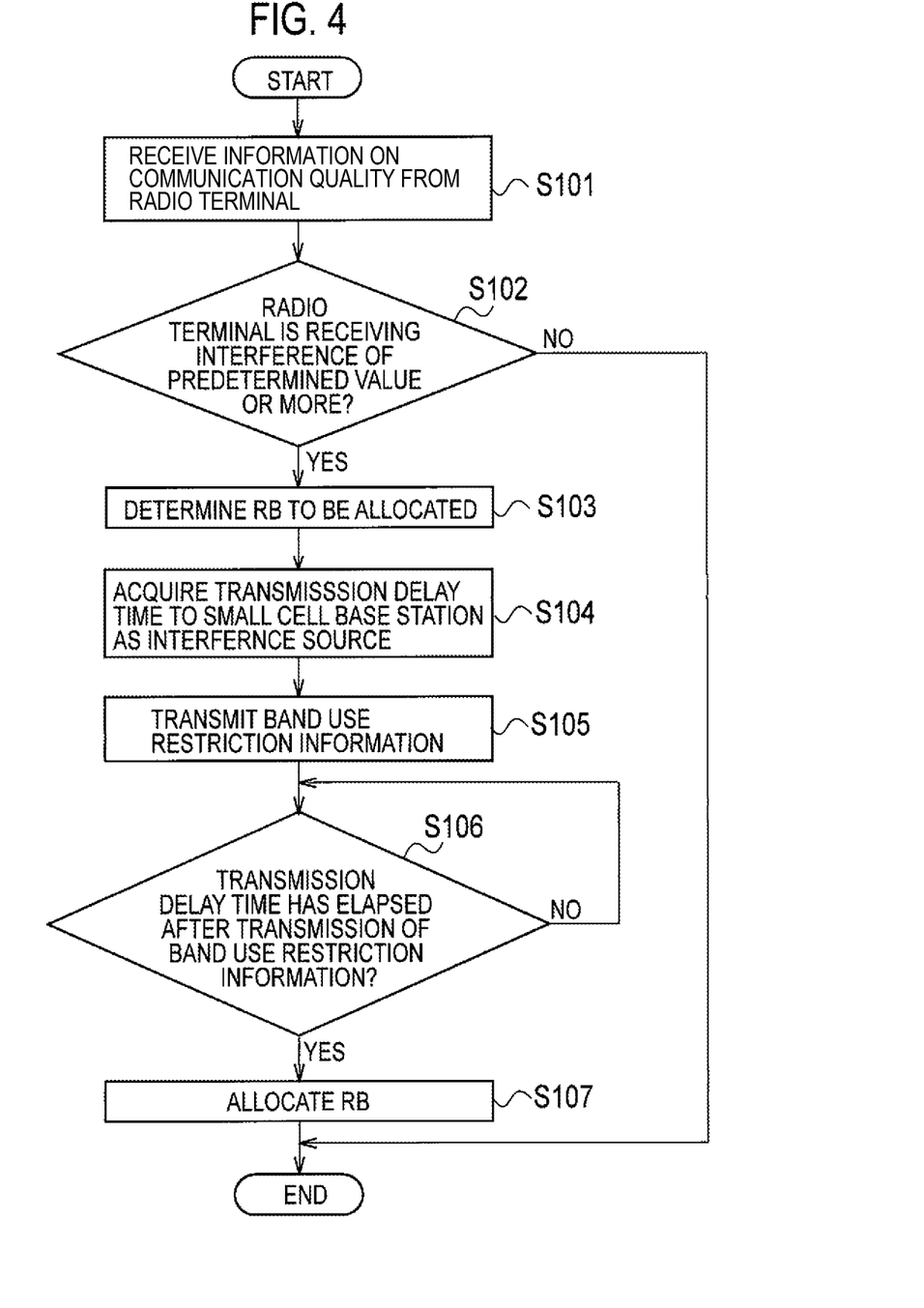
FIG. 4 is a flowchart showing a first operation of the large cell base station according to the embodiment of the present invention.

FIG. 4 is a flowchart showing a first operation of the large cell base station 100. In Step S101, the controller 120 of the large cell base station 100 receives the CQI, the RSRP (from small cell base station to large cell terminal), the RSRP (from large cell base station to large cell terminal), and the RSRP (from other large cell base station to large cell terminal) which are information indicating the communication quality in the radio terminal 200.

In Step S102, the controller 120 determines whether the radio terminal 200 is receiving the interference of a predetermined value or larger from the small cell base station 300. Specifically, the controller 120 determines whether the ratio of the amount of interference received by the radio terminal 200 from the small cell base station 300 corresponding to the RSRP (from small cell base station to large cell terminal) to the entire amount of the interference received by the radio terminal 200 is equal to or larger than the threshold value $\alpha$.

When the radio terminal 200 is not receiving the interference of the value equal to or larger than the predetermined value from the small cell base station 300, the series of operations is terminated. When the radio terminal 200 is receiving the interference of the amount equal to or larger than the predetermined value from the small cell base station 300, in Step S103, the controller 120 determines a resource block to be newly allocated to the radio terminal 200.

In Step S104, the controller 120 acquires the transmission delay time of the signal transmitted to the small cell base station 300 as the source of the interference received by the radio terminal 200.

In Step S105, the controller 120 generates the band use restriction information instructing the use restriction of the frequency band corresponding to the resource block determined in Step S103. Then, the controller 120 transmits the RNTP message including the generated band use restriction information to the small cell base station 300.

In Step S106, the controller 120 determines whether the time corresponding to the transmission delay time has elapsed after the controller 120 has transmitted the RNTP message including the band use restriction information. When the time corresponding to the transmission delay time elapses after the RNTP message including the band use restriction information is transmitted, in Step S107, the controller 120 allocates the resource block determined in Step S103 to the radio terminal 200.

Figure 5:
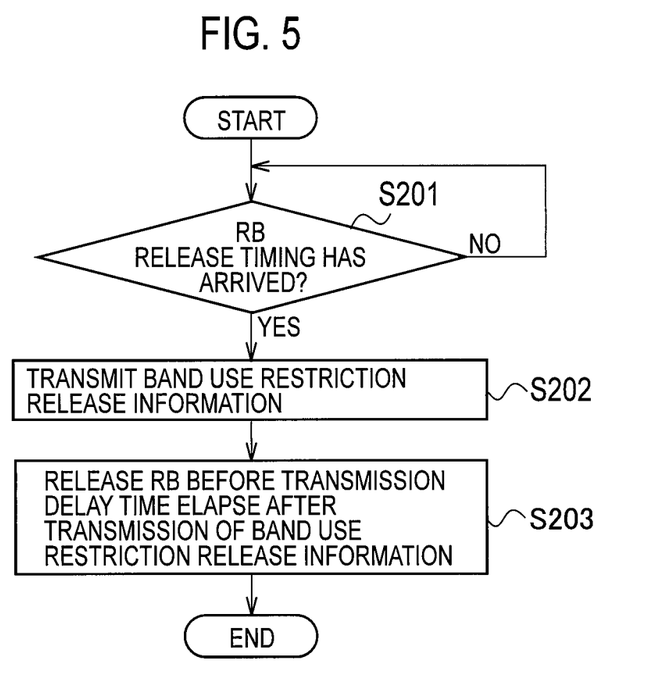
FIG. 5 is a flowchart showing a second operation of the large cell base station according to the embodiment of the present invention.

FIG. 5 is a flowchart of a second operation of the large cell base station 100.

In Step S201, the controller 120 in the large cell base station 100 determines whether the resource block release timing has arrived. When the resource block release timing has arrived, in Step S202, the controller 120 generates the band use restriction release information instructing the release of the use restriction of the frequency band corresponding to the resource block determined in Step S103 of FIG. 4. The controller 120 then transmits the RNTP message including the generated band use restriction release information to the small cell base station 300.

In Step S203, the controller 120 releases the resource block allocated to the radio terminal 200 in Step S107 before the time corresponding to the transmission delay time elapses after the RNTP message including the band use restriction release information is transmitted.

(3) Advantageous Effect

In the radio communication system 1 of the embodiment, the large cell base station 100 performs the following operation when allocating a resource block to the radio terminal 200 connected to the large cell base station 100 in a case where the large cell base station 100 has transmitted to the small cell base station 300, the band use restriction information instructing use restriction of a frequency band corresponding to the resource block. Specifically, the large cell base station 100 allocates the resource block to the radio terminal 200 when the transmission delay time of the signal from the large cell base station 100 to the small cell base station 300 has elapsed after the transmission. Thus, after the small cell base station 300 has released the resource block of which the use is restricted, the large cell base station 100 can allocate a resource block of which the frequency band partially or completely overlaps with the frequency band of the released resource block. Accordingly, the same frequency band is prevented from being used by the large cell base station 100 and the small cell base station 300, whereby the occurrence of the interference is prevented.

The large cell base station 100 performs the following operation when releasing a resource block allocated to the radio terminal 200 connected to the large cell base station 100 in a case where the large cell base station 100 has transmitted to the small cell base station 300, the band use restriction release information instructing release of the use restriction of a frequency band corresponding to the resource block. Specifically, the large cell base station 100 releases the resource block before the transmission delay time of the signal from the large base station 100 to a small cell base 300 station elapses. Thus, before the small cell base station 300 allocates the resource block of which the use restriction is released, the large cell base station 100 can release a resource block of which the frequency band partly or completely overlaps with the frequency band of the resource block. Accordingly, the same frequency band is prevented from being used by the large cell base station and the small cell base station, whereby the occurrence of the interference is prevented.

(4) Other Embodiment

The details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the above-described embodiment, the case is described in which the large cell base station 100 is a macrocell base station that forms a macrocell, and the small cell base station 300 is a femtocell base station that forms a femtocell. The present invention is not limited to the embodiment and it is sufficient if the small cell formed by the small cell base station 300 is smaller than the large cell formed by the large cell base station 100. For example, when the large cell base station 100 is the macrocell base station that forms the macrocell, the small cell base station 300 may be a base station that forms a microcell or a picocell. When the large base station 100 is the microcell base station that forms the microcell, the small cell base station may be a base station that forms a picocell or a femtocell. When the large cell base station 100 is the picocell base station that forms the picocell, the small cell base station 300 may be a base station that forms the femto.

In the above-described embodiment, the large cell base station 100 employs the PF scheme. However, the present invention can be similarly applied to a case where the round robin scheme is employed.

In the above-described embodiment, the radio communication system 1 has a configuration based on the LTE Release 9 or the LTE-Advanced. However, the radio communication system 1 may have a configuration based on other communication standards.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2009-249464 (filed on Oct. 29, 2009) is incorporated herein by reference.

INDUSTRIAL APPLICABILITY

The radio communication system, the large cell base station, and the communication control method of the present invention can appropriately reduce interference from the small cell base station to the radio terminal connected to the large cell base station, and thus are useful as a radio communication system and the like.

The invention claimed is:

1. A large cell base station to which a radio terminal is connected, the large cell base station configured to form a large cell in which a small cell base station configured to form a small cell smaller than the large cell is installed, comprising:
    an acquisition unit configured to acquire a transmission delay time of a signal from the large cell base station to the small cell base station;
    a determination unit configured to determine a radio resource to be allocated to the radio terminal;
    a band use restriction information transmitter configured to transmit band use restriction information to the small cell base station, the band use restriction information instructing use restriction of a frequency band corresponding to the radio resource determined by the determination unit; and
    an allocation unit configured to allocate the radio resource determined by the determination unit to the radio terminal after the transmission delay time has elapsed after the band use restriction information is transmitted, said transmission delay time being measured after transmitting the band use restriction information.

2. The large cell base station according to claim 1 further comprising:
    a band use restriction release information transmitter configured to transmit band use restriction release information to the small cell base station at a predetermined timing after the radio resource is allocated to the radio terminal, the band use restriction release information instructing release of the use restriction of the frequency band corresponding to the radio resource determined by the determination unit; and
    a release unit configured to release the radio resource allocated to the radio terminal before the transmission delay time elapses after the band use restriction release information is transmitted.

3. The large cell base station according to claim 1, wherein the acquisition unit acquires the transmission delay time on the basis of a change of a CQI (Channel Quality Indicator) transmitted from the radio terminal in a case where the use restriction is imposed on the frequency band corresponding to the radio resource in the small cell base station.

4. The large cell base station according to claim 1 further comprising a reception unit configured to receive information indicating a communication quality from the radio terminal, wherein the determination unit determines the radio resource to be allocated to the radio terminal when the information indicating the communication quality is received.

5. The large cell base station according to claim 1, wherein the band use restriction information transmitter transmits the band use restriction information when a ratio of an amount of interference received from the small cell base station to an entire amount of interference received by the radio terminal is equal to or larger than a predetermined value.

6. A large cell base station to which a radio terminal is connected, the large cell base station configured to form a large cell in which a small cell base station configured to form a small cell smaller than the large cell is installed, comprising:
    an acquisition unit configured to acquire a transmission delay time of a signal from the large cell base station to the small cell base station;
    a determination unit configured to determine a radio resource to be allocated to the radio terminal;
    a band use restriction information transmitter configured to transmit band use restriction information to the small cell base station, the band use restriction information instructing use restriction of a frequency band corresponding to the radio resource determined by the determination unit; and
    an allocation unit configured to allocate the radio resource determined by the determination unit to the radio terminal after the transmission delay time has elapsed after the band use restriction information is transmitted, wherein
    the acquisition unit acquires the transmission delay time on the basis of a time between transmission of a predetermined signal to the small cell base station and reception of a response signal from the small cell base station.

7. The large cell base station according to claim 6, wherein the acquisition unit corrects the transmission delay time on the basis of a reception interval of a signal periodically transmitted by the small cell base station.

8. A communication control method in a large cell base station to which a radio terminal is connected, the large cell base station configured to form a large cell in which a small cell base station configured to form a small cell smaller than the large cell is installed, comprising:
    acquiring, at the large cell base station, a transmission delay time of a signal from the large cell base station to the small cell base station;
    determining, at the large cell base station, a radio resource to be allocated to the radio terminal;
    transmitting, at the large cell base station, band use restriction information to the small cell base station, the band use restriction information instructing use restriction of a frequency band corresponding to the determined radio resource; and
    allocating, at the large cell base station, the determined radio resource to the radio terminal after the transmission delay time has elapsed after the band use restriction information is transmitted, said transmission delay time being measured after transmitting the band use restriction information.

* * * * *